(12) United States Patent
Levine et al.

(10) Patent No.: US 11,284,179 B1
(45) Date of Patent: Mar. 22, 2022

(54) WIRELESS COMMUNICATION ADAPTER

(71) Applicant: New Audio LLC, New York, NY (US)

(72) Inventors: Jonathan Levine, New York, NY (US); Thomas C. Wilson, Brooklyn, NY (US); Marshall Plummer, Nashville, TN (US); Clayton J. Pipkin, Highland Park, NJ (US); Zachary James Hellman, New York, NY (US)

(73) Assignee: New Audio LLC, New York, NY (US)

( * ) Notice: Subject to any disclaimer, the term of this patent is extended or adjusted under 35 U.S.C. 154(b) by 0 days.

(21) Appl. No.: 17/025,503

(22) Filed: Sep. 18, 2020

(51) Int. Cl.
*H04W 4/80* (2018.01)
*H04R 1/10* (2006.01)
*H04W 76/10* (2018.01)

(52) U.S. Cl.
CPC .............. *H04R 1/10* (2013.01); *H04W 4/80* (2018.02); *H04W 76/10* (2018.02)

(58) Field of Classification Search
CPC .................................. H04R 1/10; H04W 4/80
See application file for complete search history.

(56) References Cited

U.S. PATENT DOCUMENTS

| 8,773,581 B2 * | 7/2014 | Jannard | H04N 5/232 348/373 |
| 2018/0136738 A1 * | 5/2018 | Argiro | G06F 1/1626 |

OTHER PUBLICATIONS https://www.rha-audio.com/us/headphones/accessories/cables-and-adapters/wireless-flight-adapter. Wireless Flight Adapter. RHA Technologies 2020. Accessed Aug. 31, 2020.

* cited by examiner

*Primary Examiner* — Tuan H Nguyen
(74) *Attorney, Agent, or Firm* — Holzer Patel Drennan

(57) ABSTRACT

A wireless communication adapter device includes an enclosure and a communication device base. The communication device base includes a first switch and a wireless communication transceiver. The communication device base is inserted into the enclosure so that the communication device base can move along an axis within the enclosure from a first base position and a second base position. Such movement actuates the first switch against the enclosure to initiate one or more communication operations of the wireless communication transceiver in the communication device base.

18 Claims, 13 Drawing Sheets

WIRELESS COMMUNICATION ADAPTER

CROSS-REFERENCE TO RELATED APPLICATIONS

The present application is related by subject matter to U.S. Design patent application No. 29751162, filed on Sep. 18, 2020 and entitled "Wireless Communication Adapter", which is specifically incorporated herein by reference for all that it discloses and teaches.

BACKGROUND

Modern wireless audio products, such as headphones, earphones, and speakers, provide a significant improvement in user experience over traditional wired audio products. However, many audio sources, such as an audio system for an airplane seat, do not support wireless connections. As such, a user with wireless headphones, for example, can find it difficult to listen to audio from an audio system providing only a wired connection.

SUMMARY

The foregoing problem is solved by a wireless communication adapter device that includes an enclosure and a communication device base. The communication device base includes a first switch and a wireless communication transceiver. The communication device base is inserted into the enclosure so that the communication device base can move along an axis within the enclosure from a first base position and a second base position. Such movement actuates the first switch against the enclosure to initiate one or more communication operations of the wireless communication transceiver in the communication device base.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
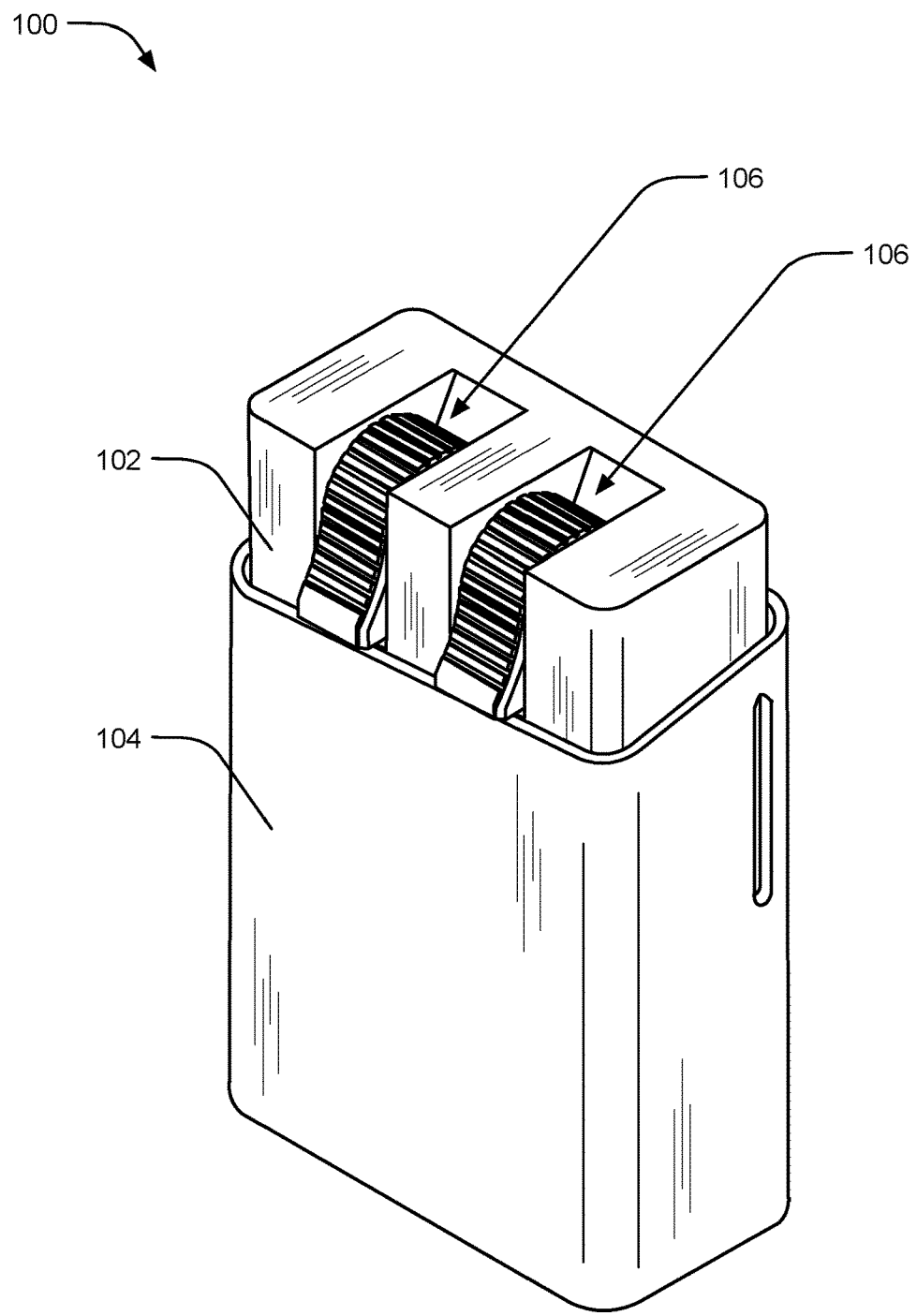
FIG. 1 illustrates a perspective view of an example wireless communication adapter including a communication device base in a closed base position relative to an enclosure and two connector jacks in a closed connector position.

FIG. 1 illustrates a perspective view of an example wireless communication adapter 100 including a communication device base 102 in a closed base position relative to an enclosure 104 and two connector jacks 106 in a closed connector position. The communication device base 102 is inserted (e.g., positioned) into the enclosure 104 and is capable of movement along an axis within the enclosure 104. The two connector jacks 106 are closed against the communication device base 102 within the enclosure 104. It should be understood that other implementations may employ more or less than two connector jacks.

Figure 2:
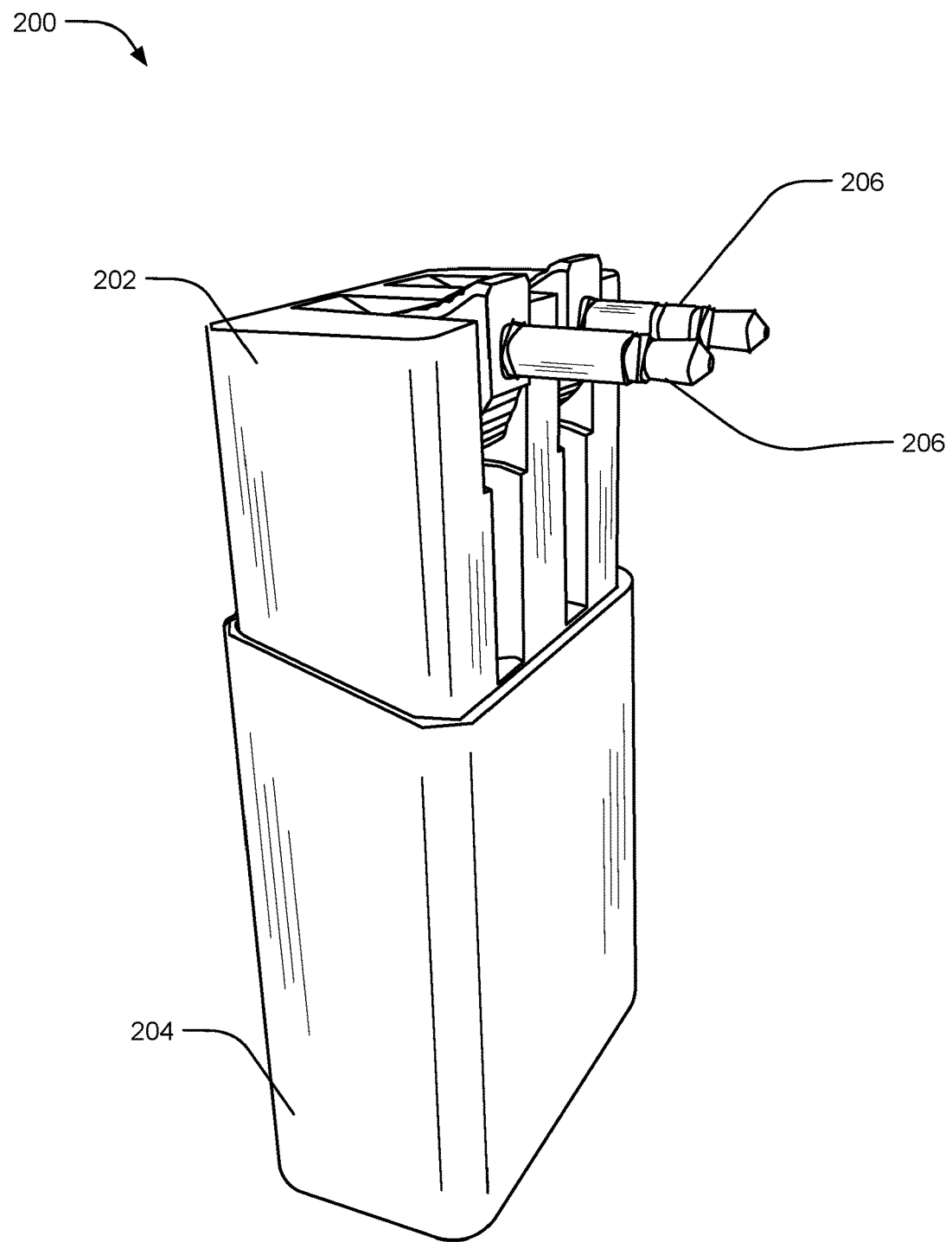
FIG. 2 illustrates a perspective view of an example wireless communication adapter including a communication device base in an extended base position relative to an enclosure and two connector jacks in an open connector position.

FIG. 2 illustrates a perspective view of an example wireless communication adapter 200 including a communication device base 202 in an extended base position relative to an enclosure 204 and two connector jacks 206 in an open connector position. It should be noted that an open connector position may denote a position in which a connector jack is rotated or extended away from the communication device base 202 or is moved in some other way as to make the connector jack available for electrical connection to an electronic port (e.g., an audio port). The communication device base 202 is inserted (e.g., positioned) into the enclosure 204 and is capable of movement along an axis within the enclosure 204. The two connector jacks 206 are opened (rotated away from) the communication device base 202 and removed from the enclosure 204. It should be understood that other implementations may employ more or less than two connector jacks and that the connector jacks may move independently of each other.

Figure 3:
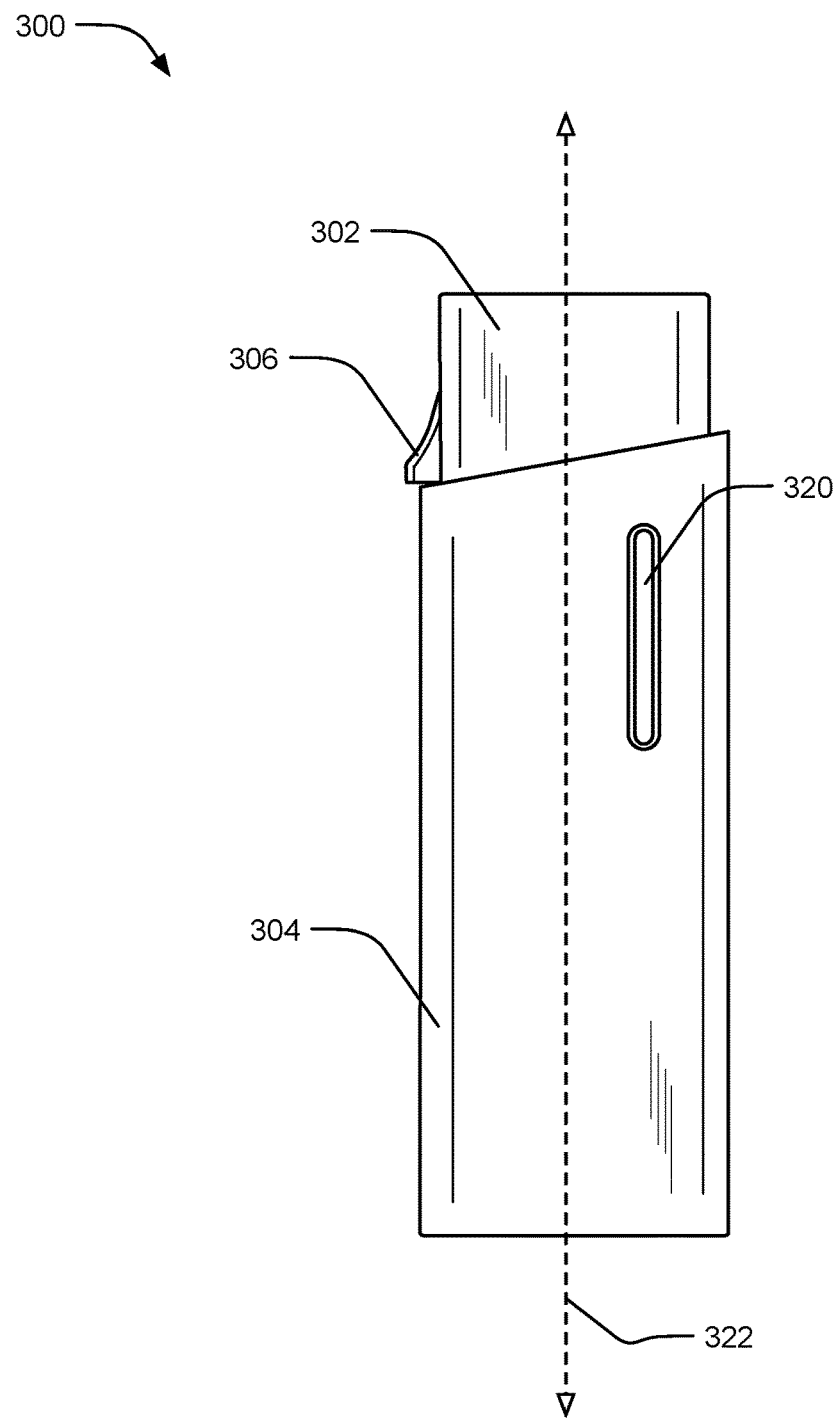
FIG. 3 illustrates a side view of an example wireless communication adapter including a communication device base in a closed base position relative to an enclosure and two connector jacks in a closed connector position.

FIG. 3 illustrates a side view of an example wireless communication adapter 300 including a communication device base 302 in a closed base position relative to an enclosure 304 and two connector jacks 306 in a closed connector position. The communication device base 302 is inserted (e.g., positioned) into the enclosure 304 and is capable of movement along an axis 322 within the enclosure 304. The two connector jacks 306 are closed against the communication device base 302 within the enclosure 304. A window 320 in the enclosure 304 allows one or more indicators (e.g., lights, LEDs, markings) to be visible to a user through the enclosure 304 in a variety of base positions.

Figure 4:
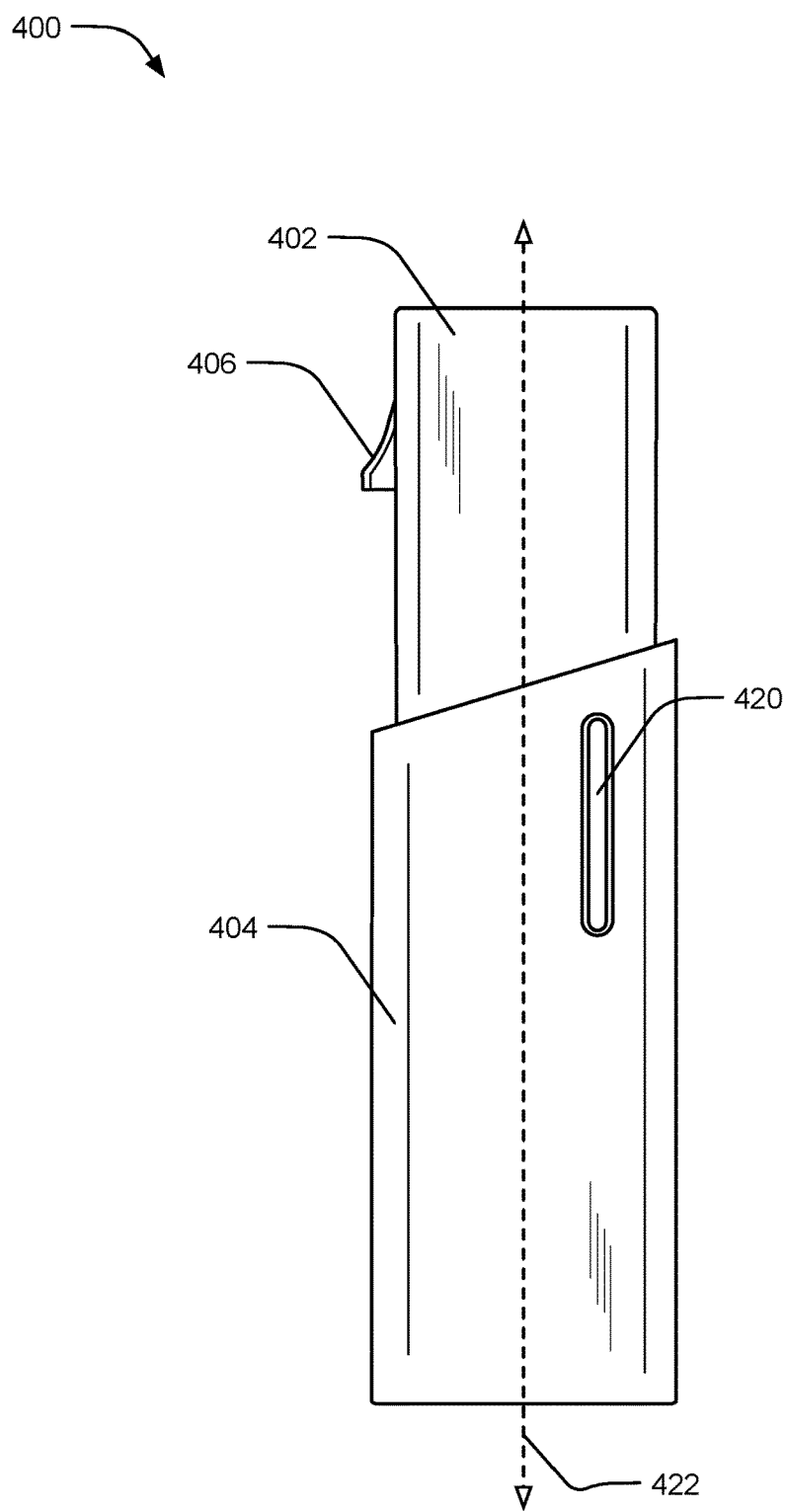
FIG. 4 illustrates a side view of an example wireless communication adapter including a communication device base in an extended base position relative to an enclosure and two connector jacks in a closed connector position.

FIG. 4 illustrates a side view of an example wireless communication adapter 400 including a communication device base 402 n an extended base position relative to an enclosure 404 and two connector jacks 406 in a closed connector position. The communication device base 402 is inserted (e.g., positioned) into the enclosure 404 and is capable of movement along an axis 422 within the enclosure 404. The two connector jacks 406 are closed against the communication device base 402 within the enclosure 404. A window 420 in the enclosure 404 allows one or more indicators (e.g., lights, LEDs, markings) to be visible to a user through the enclosure 404 in a variety of base positions.

Figure 5:
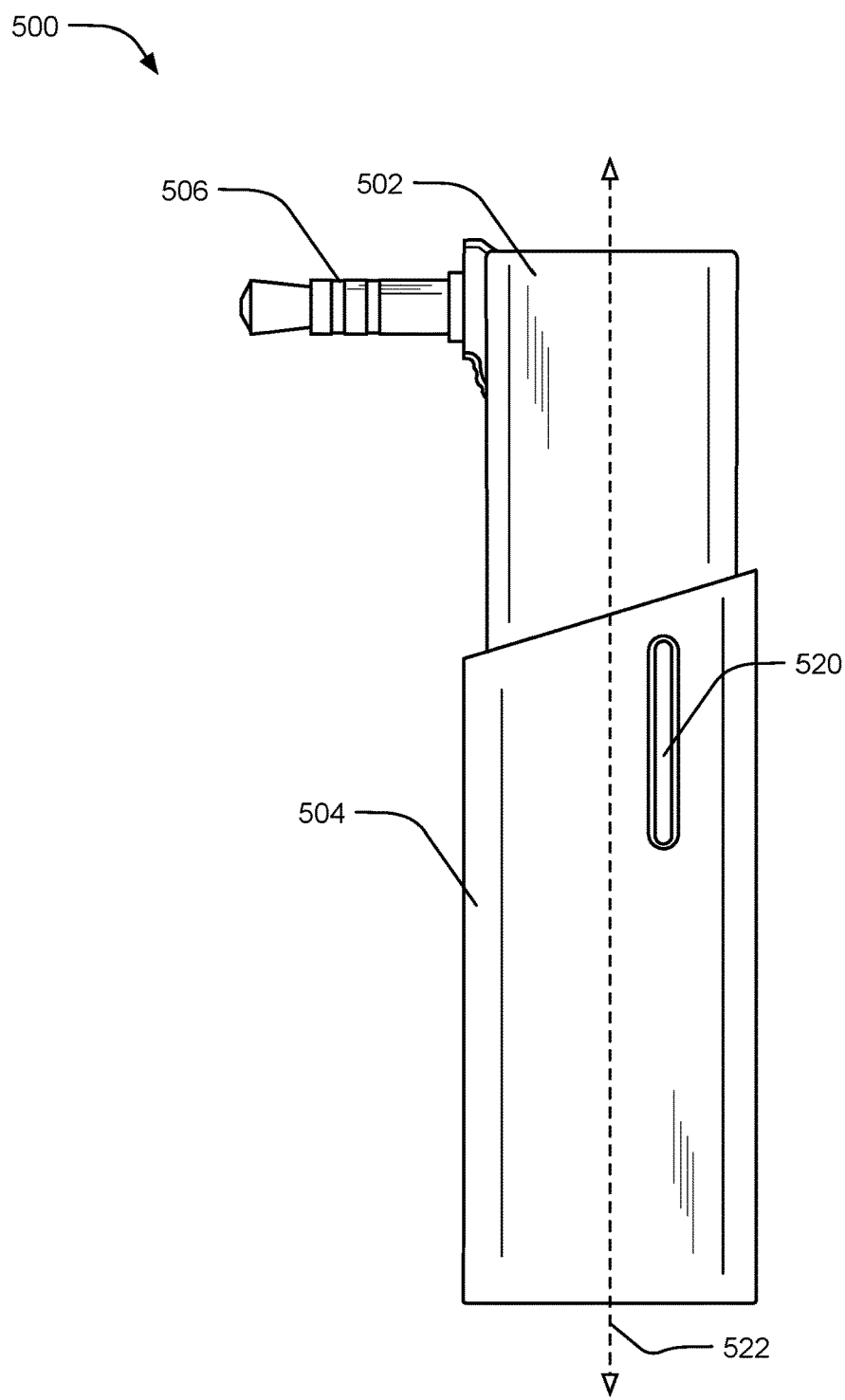
FIG. 5 illustrates a side view of an example wireless communication adapter including a communication device base in an extended base position relative to an enclosure and two connector jacks in an open connector position.

FIG. 5 illustrates a side view of an example wireless communication adapter 500 including a communication device base 502 in an extended base position relative to an enclosure 504 and two connector jacks 506 in an open connector position. The communication device base 502 is inserted into the enclosure 504 and is capable of movement along an axis 522 within the enclosure 504. The two connector jacks 506 are opened away from the communication device base 502 and removed from the enclosure 504. A window 520 in the enclosure 504 allows one or more indicators (e.g., lights, LEDs, markings) to be visible to a user through the enclosure 504 in a variety of base positions.

Figure 6:
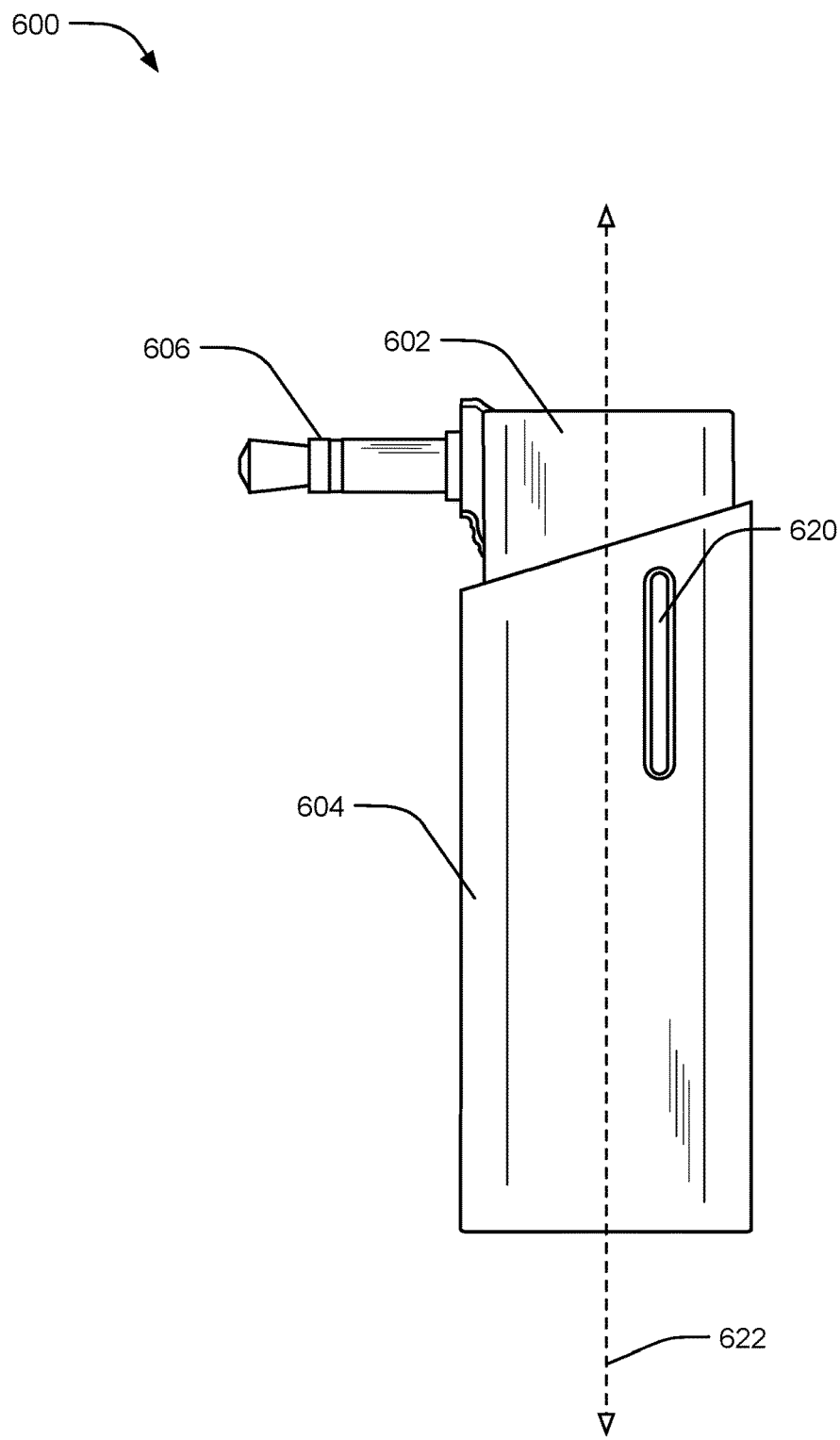
FIG. 6 illustrates a side view of an example wireless communication adapter including a communication device base in a closed base position relative to an enclosure and two connector jacks in an open connector position.

FIG. 6 illustrates a side view of an example wireless communication adapter 600 including a communication device base 602 in a closed base position relative to an enclosure 604 and two connector jacks 606 in an open connector position. The communication device base 602 is inserted into the enclosure 604 and is capable of movement along an axis 622 within the enclosure 604. The two connector jacks 606 are opened away from the communication device base 602 and removed from the enclosure 604. After the two connector jacks 606 were removed from the enclosure 604 and opened away from the communication device base 602, the communication device base 602 was moved back to a closed base condition. Because one or both of the two connector jacks 606 are in the open connector position, the example wireless communication adapter 600 maintains its communication operations (e.g., a wireless connection to a remote wireless transceiver, such as in a pair of Bluetooth headphones) rather than powering down or entering standby mode. The two connector jacks 706 are rotated about 90 degrees from the closed connector position. A window 620 in the enclosure 604 allows one or more indicators (e.g., lights, LEDs, markings) to be visible to a user through the enclosure 604 in a variety of base positions.

Figure 7:
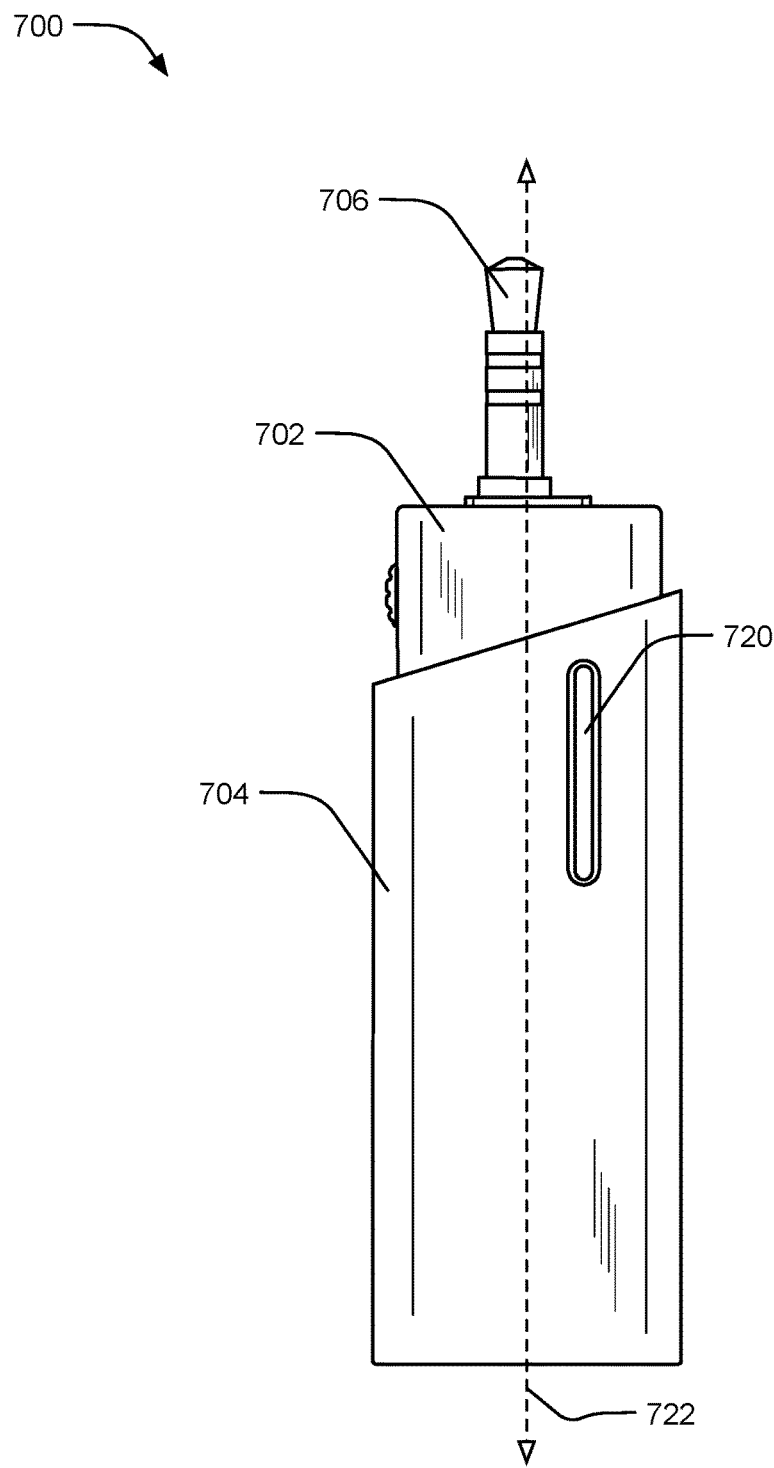
FIG. 7 illustrates a side view of an example wireless communication adapter including a communication device base in a closed base position relative to an enclosure and two connector jacks in a different open connector position.

FIG. 7 illustrates a side view of an example wireless communication adapter 700 including a communication device base 702 in a closed base position relative to an enclosure 704 and two connector jacks 706 in a different open connector position (as compared to FIG. 6). The communication device base 702 is inserted into the enclosure 704 and is capable of movement along an axis 722 within the enclosure 704. The two connector jacks 706 are opened away from the communication device base 702 and removed from the enclosure 704. After the two connector jacks 706 were removed from the enclosure 704 and opened away from the communication device base 702, the communication device base 702 was moved back to a closed base condition. Because one or both of the two connector jacks 706 are in the open connector position, the example wireless communication adapter 700 maintains its communication operations (e.g., a wireless connection to a remote wireless transceiver, such as in a pair of Bluetooth headphones) rather than powering down or entering standby mode. In contrast to FIG. 6, the two connector jacks 706 are rotated about 180 degrees from the closed connector position. A window 720 in the enclosure 704 allows one or more indicators (e.g., lights, LEDs, markings) to be visible to a user through the enclosure 704 in a variety of base positions.

Figure 8:
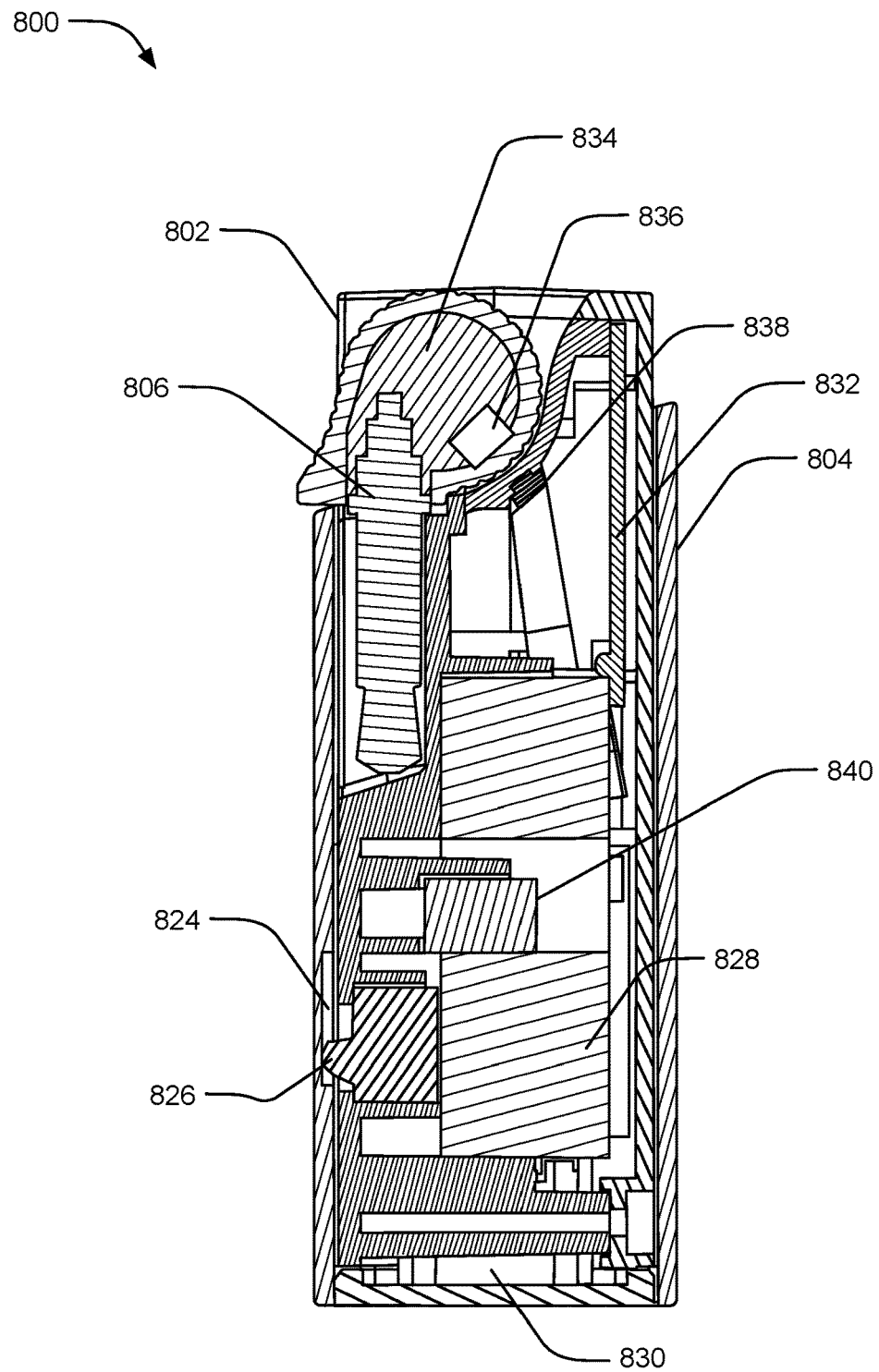
FIG. 8 illustrates a cross-sectional view of an example wireless communication adapter including a communication device base in a closed base position relative to an enclosure and two connector jacks in a closed connector position.

FIG. 8 illustrates a cross-sectional view of an example wireless communication adapter 800 including a communication device base 802 in a closed base position relative to an enclosure 804 and two connector jacks 806 in a closed connector position. The enclosure 804 forms a sleeve around the communication device base 802, allowing the communication device base 802 to slide up and down within the enclosure 804. In other implementations, the enclosure 804 need not enclose the entire perimeter of the communication device base 802. As shown in FIG. 8, at a portion of the interior surface of the enclosure 804 includes a recess 824, although another structure could be employed (e.g., a protrusion, a ramp, a ridge).

Figure 9:
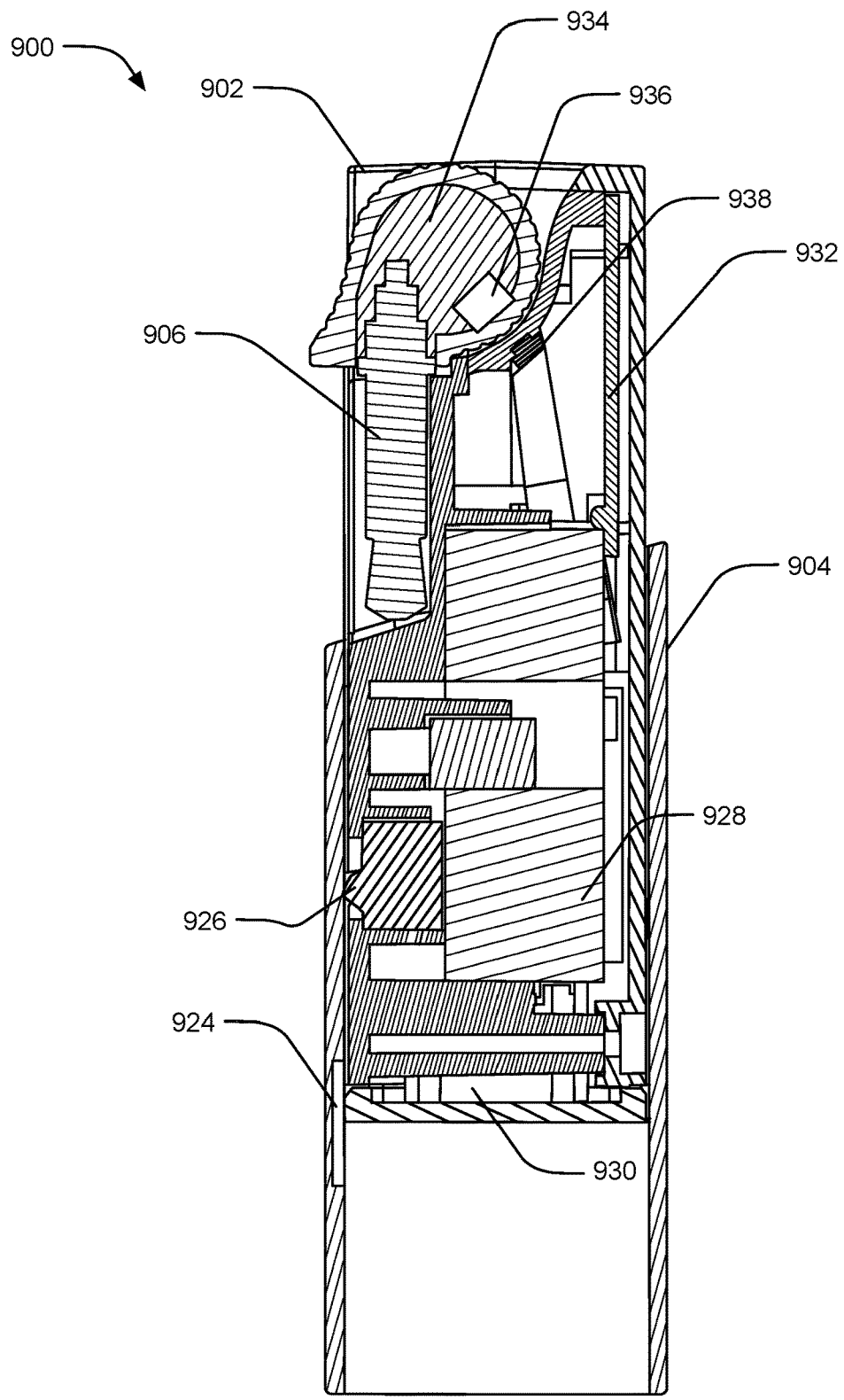
FIG. 9 illustrates a cross-sectional view of an example wireless communication adapter including a communication device base in an extended base position relative to an enclosure and two connector jacks in a closed connector position.
Figure 10:
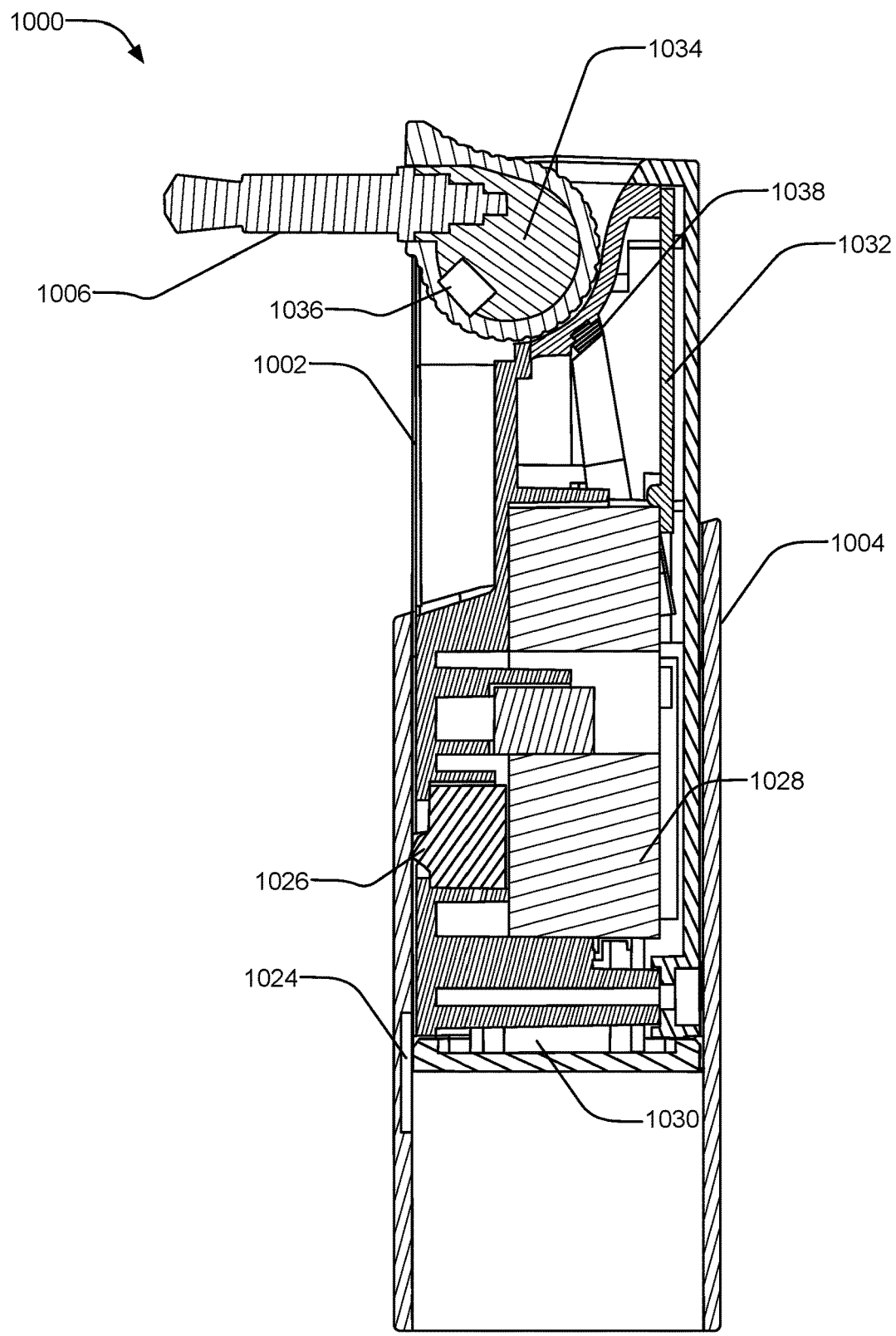
FIG. 10 illustrates a cross-sectional view of an example wireless communication adapter including a communication device base in an extended base position relative to an enclosure and two connector jacks in an open connector position.

The communication device base 802 includes a base switch 826, which is activated by the recess 824 as the communication device base 802 moves between a closed base position and an extended base position. For example, the base switch 826 in FIG. 8 extends into the recess 824. However, as the communication device base 802 moves toward the extended base position (as shown in FIGS. 9 and 10), the base switch 826 clears the recess 824, which depresses the base switch 826 toward the communication device base 802 and actuates the base switch 826. Actuation of the base switch 826 as the communication device base 802 moves from the closed base position toward the extended base position can represent a transition from one logic state to another and initiate one or more communication operations in the communication device base 802.

The communication device base 802 also includes a power source (e.g., a battery 828), and input/output (I/O) port (e.g., a USB-C port a USB-C port 830), and a printed circuit board (PCB) 832 on which one or more hardware processors (e.g., microcontrollers), memory, a wireless communication transceiver, and other circuitry are mounted. The two connector jacks 806 are mounted in rotatable plastic molds 834. At least one of the rotatable plastic molds 834 contains a magnet 836. When the wired connector jack 806 that contains the magnetic rotates from a closed connector position to an open connector position, the magnet 836 moves away from a magnetic sensor switch on a flexible printed circuit (FPC) 838, which is connected to a communications controller on the PCB 832. This movement of the magnet 836 away from the magnetic sensor switch actuates the magnetic sensor switch from a first logic state to a second logic state. When the wired connector jack 806 that contains the magnetic 836 rotates from an open connector position to a closed connector position, the magnet 836 moves back into alignment with a magnetic sensor switch on a flexible printed circuit (FPC) 838, actuating the magnetic sensor switch from the second logic state to the first logic state. Such state transitions are monitored by the communications controller in combination with the logic states corresponding to the closed and extended positions of the communication device base 802. Based on these logic states, the communications controller can initiate and terminate communication operations of the example wireless communication adapter 800.

Accordingly, when the example wireless communication adapter 800 is in the positioning illustrated in FIG. 8, it is typically quiescent or about to enter a quiescent state. For example, if the example wireless communication adapter 800 has moved from an extended base position to the closed base position (with the connector jacks in a closed connector position), the example wireless communication adapter 800 may terminate all communication operations and enter a power-down, standby, or sleep mode (possibly after expiration of a timer). In contrast, if the example wireless communication adapter 800 then moves from the closed base position to the extended base position, the example wireless communication adapter 800 may initiate a communication operation, such as activating a wireless pairing operation between the wireless communication transceiver and a remote wireless transceiver (possibly, subject to a timer).

One or more magnets (see magnet 840) can be positioned in the communication device base 802 and/or the enclosure 804 to provide alignment assistance with the various base positions along the axis of the enclosure 804. For example, the magnet 840 can align with one set of magnets in the enclosure when in the closed base position, and a different set of magnets in the closed base position. Alternatively, different combinations of magnets in one or both of the communication device base 802 and the enclosure 804 may be employed.

FIG. 9 illustrates a cross-sectional view of an example wireless communication adapter 900 including a communication device base 902 in an extended base position relative to an enclosure 904 and two connector jacks 906 in a closed connector position. The enclosure 904 forms a sleeve around the communication device base 902, allowing the communication device base 902 to slide up and down within the enclosure 904. As shown in FIG. 9, at a portion of the interior surface of the enclosure 904 includes a recess 924, although another structure could be employed (e.g., a protrusion, a ramp, a ridge).

The communication device base 902 includes a base switch 926, which is activated by the recess 924 as the communication device base 902 moves between a closed base position and an extended base position. The base switch 926 slidingly contacts the interior surface of the enclosure 904, in some points extending into the recess 924 and in other points being depressed toward the communication device base 902 because it is not aligned with the recess. For example, the base switch 926 in FIG. 9 has been depressed into the communication device base 902 by the interior surface of the enclosure 904 to actuates the base switch 926 because the base switch 926 has moved past (cleared) the recess 924. Actuation of the base switch 926 as the communication device base 902 moves from the closed base position toward the extended base position can represent a transition from one logic state to another and initiate one or more communication operations in the communication device base 902.

The communication device base 902 also includes a power source (e.g., a battery 928), and input/output (I/O) port (e.g., a USB-C port a USB-C port 930), and a printed circuit board (PCB) 932 on which one or more hardware processors (e.g., microcontrollers), memory, a wireless communication transceiver, and other circuitry are mounted. The two connector jacks 906 are mounted in rotatable plastic molds 934. At least one of the rotatable plastic molds 934 contains a magnet 936. When the wired connector jack 906 that contains the magnetic rotates from a closed connector position to an open connector position, the magnet 936 moves away from a magnetic sensor switch on a flexible printed circuit (FPC) 938, which is connected to a communications controller on the PCB 932. This movement of the magnet 936 away from the magnetic sensor switch actuates the magnetic sensor switch from a first logic state to a second logic state. When the wired connector jack 906 that contains the magnetic 936 rotates from an open connector position to a closed connector position, the magnet 936 moves back into alignment with a magnetic sensor switch on a flexible printed circuit (FPC) 938, actuating the magnetic sensor switch from the second logic state to the first logic state. Such state transitions are monitored by the communications controller in combination with the logic states corresponding to the closed and extended positions of the communication device base 902. Based on these logic states, the communications controller can initiate and terminate communication operations of the example wireless communication adapter 900.

Accordingly, when the example wireless communication adapter 900 enters the positioning illustrated in FIG. 9 from a closed base position, it typically executes a communication operation, such as activating a wireless pairing operation with a remote wireless transceiver.

FIG. 10 illustrates a cross-sectional view of an example wireless communication adapter 1000 including a communication device base 1002 in an extended base position relative to an enclosure 1004 and two connector jacks 1006 in an open connector position. The enclosure 1004 forms a sleeve around the communication device base 1002, allowing the communication device base 1002 to slide up and down within the enclosure 1004. As shown in FIG. 10, at a portion of the interior surface of the enclosure 1004 includes a recess 1024, although another structure could be employed (e.g., a protrusion, a ramp, a ridge).

The communication device base 1002 includes a base switch 1026, which is activated by the recess 1024 as the communication device base 902 moves between a closed base position and an extended base position. For example, the base switch 1026 in FIG. 10 has been depressed into the communication device base 1002 by the interior surface of the enclosure 1004 to actuates the base switch 1026 because the base switch 1026 has moved past (cleared) the recess 1024. Actuation of the base switch 1026 as the communication device base 1002 moves from the closed base position toward the extended base position represents a transition from one logic state to another and initiates one or more communication operations in the communication device base 1002.

The communication device base 1002 also includes a power source (e.g., a battery 1028), and input/output (I/O) port (e.g., a USB-C port a USB-C port 1030), and a printed circuit board (PCB) 1032 on which one or more hardware processors (e.g., microcontrollers), memory, a wireless communication transceiver, and other circuitry are mounted. The two connector jacks 1006 are mounted in rotatable plastic molds 1034. At least one of the rotatable plastic molds 1034 contains a magnet 1036. When the wired connector jack 1006 that contains the magnetic 1036 rotates from a closed connector position to an open connector position shown in FIG. 10, the magnet 1036 moves away from a magnetic sensor switch on a flexible printed circuit (FPC) 1038, which is connected to a communications controller on the PCB 1032. This movement of the magnet 1036 away from the magnetic sensor switch actuates the magnetic sensor switch from a first logic state to a second logic state. When the wired connector jack 1006 that contains the magnetic rotates from an open connector position to a closed connector position, the magnet 1036 moves back into alignment with a magnetic sensor switch on a flexible printed circuit (FPC) 1038, actuating the magnetic sensor switch from the second logic state to the first logic state. Such state transitions are monitored by the communications controller in combination with the logic states corresponding to the closed and extended positions of the communication device base 1002. Based on these logic states, the communications controller can initiate and terminate communication operations of the example wireless communication adapter 1000.

Accordingly, when the example wireless communication adapter 1000 enters the positioning illustrated in FIG. 10 from a closed base position, it is typically executing a communication operation, such as establishing or maintaining a wireless connection with a remote wireless transceiver.

Figure 11:
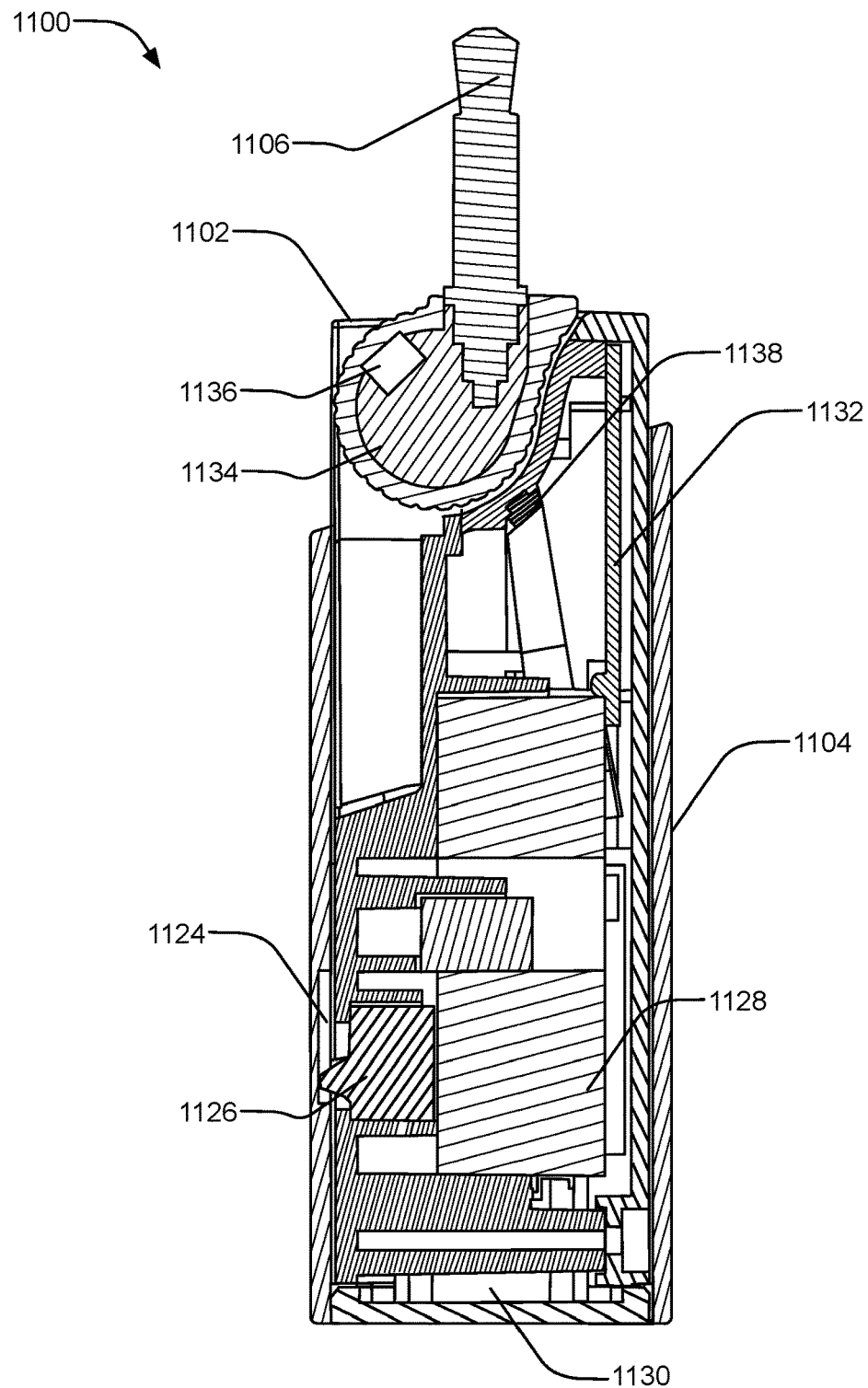
FIG. 11 illustrates a cross-sectional view of an example wireless communication adapter including a communication device base in a closed base position relative to an enclosure and two connector jacks in a different open connector position.

FIG. 11 illustrates a cross-sectional view of an example wireless communication adapter including a communication device base in a closed base position relative to an enclosure and two connector jacks in a different open connector position. The enclosure 1104 forms a sleeve around the communication device base 1102, allowing the communication device base 1102 to slide up and down within the enclosure 1104. As shown in FIG. 11, at a portion of the interior surface of the enclosure 1104 includes a recess 1124, although another structure could be employed (e.g., a protrusion, a ramp, a ridge).

The communication device base 1102 includes a base switch 1126, which is activated by the recess 1124 as the communication device base 1102 moves between a closed base position and an extended base position. For example, the base switch 1126 in FIG. 11 has been depressed into the communication device base 1102 by the interior surface of the enclosure 1104 to actuates the base switch 1126 because the base switch 1126 has moved past (cleared) the recess 1124. Actuation of the base switch 1126 as the communication device base 1102 moves from the closed base position toward the extended base position represents a transition from one logic state to another and initiates one or more communication operations in the communication device base 1102.

The communication device base 1102 also includes a power source (e.g., a battery 1128), and input/output (I/O) port (e.g., a USB-C port a USB-C port 1130), and a printed circuit board (PCB) 1132 on which one or more hardware processors (e.g., microcontrollers), memory, a wireless communication transceiver, and other circuitry are mounted. The two connector jacks 1106 are mounted in rotatable plastic molds 1134. At least one of the rotatable plastic molds 1134 contains a magnet 1136. When the wired connector jack 1106 that contains the magnetic 1136 rotates from a closed connector position to an open connector position, the magnet 1136 moves away from a magnetic sensor switch on a flexible printed circuit (FPC) 1138, which is connected to a communications controller on the PCB 1132. This movement of the magnet 1136 away from the magnetic sensor switch actuates the magnetic sensor switch from a first logic state to a second logic state. When the wired connector jack 1106 that contains the magnetic rotates from an open connector position to a closed connector position, the magnet 1136 moves back into alignment with a magnetic sensor switch on a flexible printed circuit (FPC) 1138, actuating the magnetic sensor switch from the second logic state to the first logic state. Such state transitions are monitored by the communications controller in combination with the logic states corresponding to the closed and extended positions of the communication device base 1102. Based on these logic states, the communications controller can initiate and terminate communication operations of the example wireless communication adapter 1100.

Accordingly, when the example wireless communication adapter 1100 enters the positioning illustrated in FIG. 11, it is typically executing a communication operation, such as establishing or maintaining a wireless connection with a remote wireless transceiver.

Figure 12:
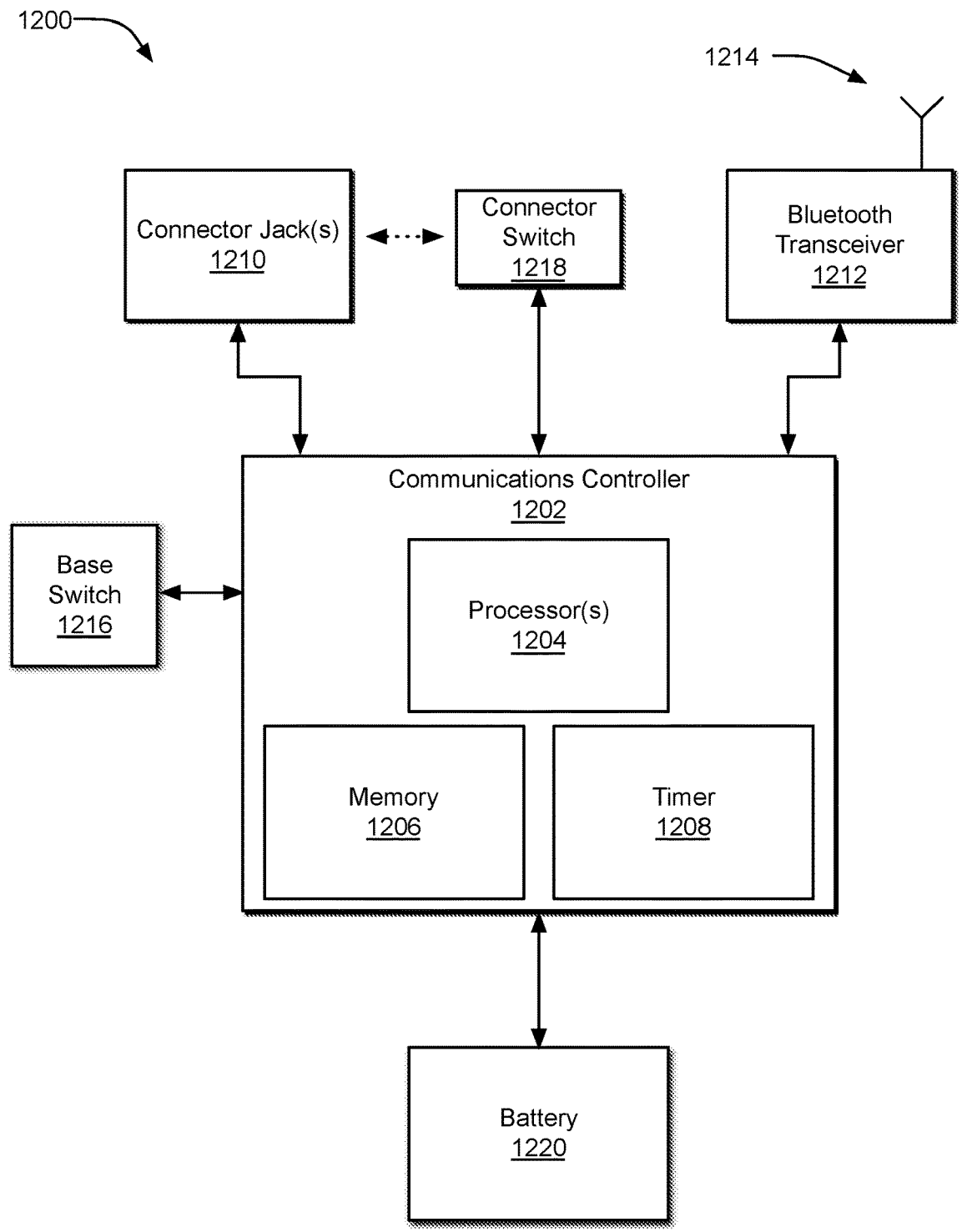
FIG. 12 illustrates a schematic of an example wireless communication adapter.

FIG. 12 illustrates a schematic of an example wireless communication adapter 1200. In at least one implementations, the components of FIG. 12 are contained within or on a communication device base of the example wireless communication adapter 1200, although some implementation may separate one or more of the components to other elements of the example wireless communication adapter 1200.

In the illustrated implementation, a communications controller 1202 manages the logic states and operations of the example wireless communication adapter 1200. The communications controller 1202 contains one or more hardware processors 1204, memory 1206, and a timer 1208, although other implementations may employ different components. The communications controller 1202 may be in the form of an ASIC (application-specific integrated circuit), an application-specific standard product, an FPGA (field-programmable gate array), a standard integrated circuit, or some other combination of integrated and/or discrete components and may include a microcontroller. The memory 1206 constitutes an example non-transitory computer-readable storage medium, which excludes signals per se, and can be used to store firmware instructions, pairing parameters, credentials, compliance parameters, etc. The one or more hardware processors 1204 can execute firmware instructions and access data stored in the memory 1206.

The communications controller 1202 is electrically connected to one or more connector jacks 1210 (e.g., a wired 3.5 mm AUX plug) and a wireless transceiver 1212 (e.g., a Bluetooth transceiver). The connector jacks 1210 are suitable for electrically connecting to a standard 3.5 mm port, such as on a laptop computer, a mobile phone, a tablet computer, etc., although other forms of connector jacks may be employed, including without limitation, Lightning connectors, USB-C connectors, 2.5 mm audio jacks, and ¼" audio jacks. The Bluetooth transceiver 1212 includes an antenna 1214 for transmitting and receiving wireless signals from a remote wireless transceiver (e.g., in a pair of Bluetooth headphones or earphones). The connector jacks 1210 are electrically connected to the wireless transceiver 1212, such as to pass an electrical audio signal from the connector jacks 1210 to the wireless transceiver 1212 and then to the remote wireless transceiver.

The communications controller 1202 is connected to a base switch 1216 and a connector switch 1218. The base switch 1216 is actuated by movement of the communication device base within an enclosure and indicates the closed or extended base position of the communication device base within an enclosure. Example closed base positions are shown in FIGS. 1, 3, 6, 8, and 11, and example extended base positions are shown in FIGS. 2, 4, 5, 9, and 10. The connector switch 1218 is actuated by movement of one or more of the connector jacks 1210 between a closed connector position to an open connector position, which in one implementation is detected by alignment/misalignment of a magnetic detector switch with a magnet positioned in a rotatable plastic mold holding one or more of the connector jacks 1210, although other switching mechanisms may be employed. Example closed connector positions are shown in FIGS. 1, 3, 4, 8, and 9, and example open connector positions are shown in FIGS. 2, 5, 6, 7, 10, and 11.

In one implementation, all electrical components of the example wireless communication adapter 1200 are powered by a battery 1220 and/or a USB-C port (not shown), although other power sources are contemplated. In one implementation, the base switch 1216 enables and disables power to the electrical components of the example wireless communication adapter 1200, although in other implementations, power is managed by the communications controller 1202.

Figure 13:
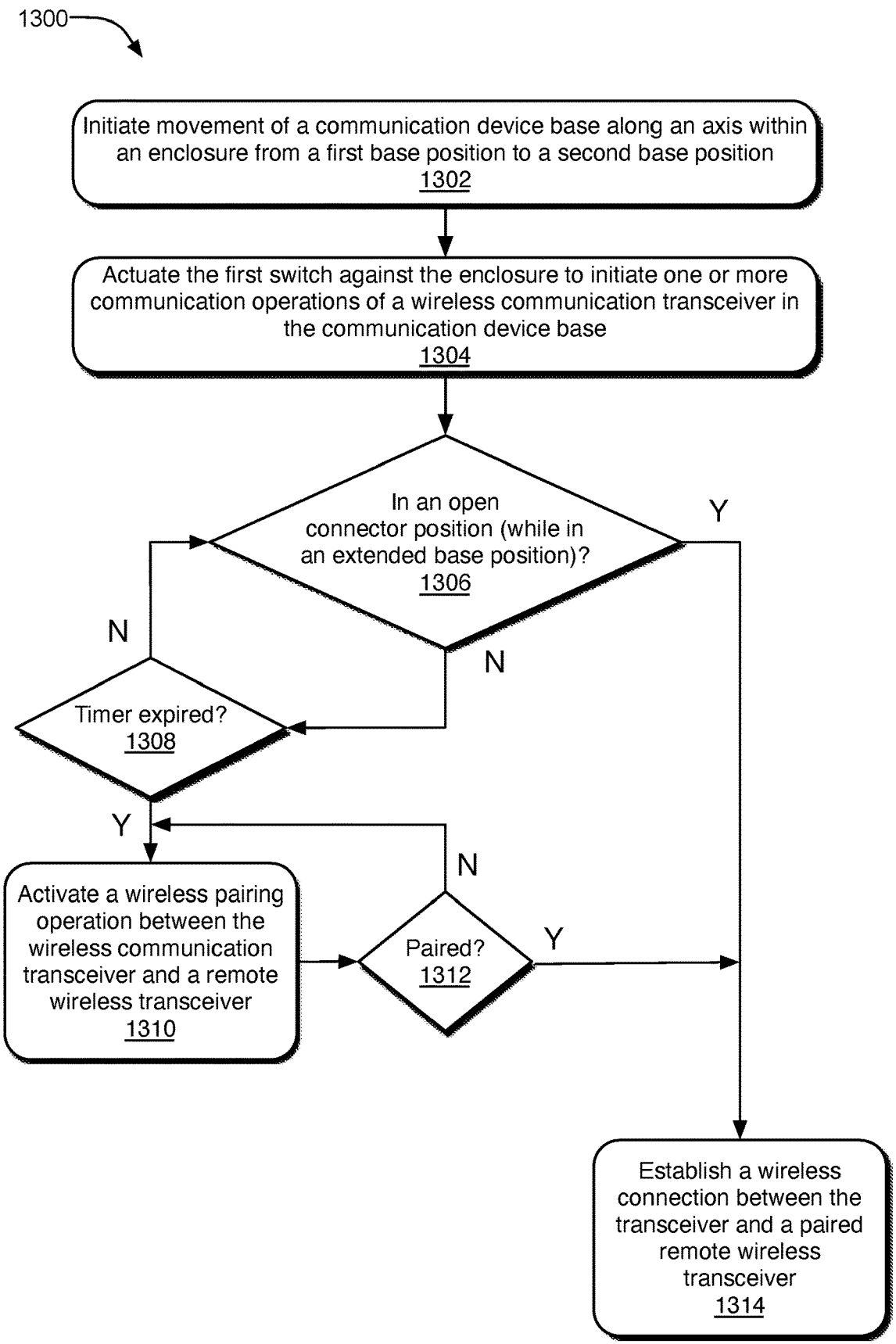
FIG. 13 illustrates a flow diagram of example operations for initiating one or more communication operations in an example wireless communication adapter.

FIG. 13 illustrates a flow diagram of example operations 1300 for initiating one or more communication operations in an example wireless communication adapter. A movement operation 1302 initiates movement of a communication device base along an axis within an enclosure from a first base position (e.g., a closed base position) to a second base position (e.g., an extended base position). A base switching operation 1304 actuates a first switch (e.g., a base switch) against the enclosure to initiate one or more communications operations of a wireless communication transceiver within the communication device base. For example, the base switching operation 1304 may initiate the supply of power to a communications controller and/or trigger a sequence of operations described below.

A decision operation 1306 evaluates the logic state of the example wireless communication adapter. If the example wireless communication adapter determined by the communications controller to be in an open connector position (while being in an extended base position), then a connection operation 1314 establishes (or attempts to establish) a wireless connection between the wireless communication transceiver of the communication device base and a paired remote wireless transceiver (e.g., in Bluetooth headphones). If the example wireless communication adapter is determined by the communications controller to be in a closed connector position (while being in an extended base position), then another decision operation 1308 determines whether a timer (e.g., about 5 seconds) has expired. If the timer has not expired, the operations 1306 and 1308 keep checking the connector position and the timer status. If the timer has expired (while the example wireless communication adapter is in an extended base position and an open connector position), then a pairing operation 1310 activates a wireless pairing operation with the wireless communication transceiver within the communication device base.

A decision operation 1312 monitors whether the pairing operation with a remote wireless transceiver (e.g., in Bluetooth headphones) was successful. If not, the pairing operation 1310 continues. If so, the connection operation 1314 establishes (or attempts to establish) a wireless connection between the wireless communication transceiver of the communication device base and a paired remote wireless transceiver.

Various operations in the flow diagram of FIG. 13 can be terminated by returning the connector jacks to a closed connector position and returning the communication device base to a closed base position.

An example wireless communication adapter may include a variety of tangible processor-readable storage media and intangible processor-readable communication signals. Tangible processor-readable storage can be embodied by any available media that can be accessed by the wireless communication adapter and includes both volatile and nonvolatile storage media, removable and non-removable storage media. Tangible processor-readable storage media excludes signals per se (such as a modulated data signal) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the wireless communication adapter. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software/firmware product or packaged into multiple software/firmware products.

What is claimed is:

1. A wireless communication adapter device comprising:
   an enclosure; and
   a communication device base including a first switch, a wired connector jack, and a wireless communication transceiver, the communication device base being inserted into the enclosure;
   wherein movement of the communication device base along an axis within the enclosure from a first base position and a second base position actuates the first switch against the enclosure to initiate one or more communication operations of the wireless communication transceiver in the communication device base; and wherein the wired connector jack is movably attached to the communication device base, the wired connector jack being configured to move with respect to the communication device base between at least a first connector position and a second connector position, when the communication device base is in the second base position.

2. The wireless communication adapter device of claim 1, wherein the first switch is configured to slidingly contact an interior surface of the enclosure as the communication device base moves between the first base position and the second base position.

3. The wireless communication adapter device of claim 1, wherein the first switch is actuated by a structure on an interior surface of the enclosure as the communication device base moves between the first base position and the second base position.

4. The wireless communication adapter device of claim 1, wherein the wired connector jack is at least partially inserted into the enclosure when the communication device base is in the first base position.

5. The wireless communication adapter device of claim 1, wherein the wired connector jack is removed from the enclosure when the communication device base is in the second base position.

6. A method of operating a wireless communication adapter device including an enclosure and a communication device base inserted into the enclosure, the communication device base having a first switch, a wired connector jack, and a wireless communication transceiver, the method comprising:
moving the communication device base along an axis within the enclosure from a first base position within the enclosure to a second base position within the enclosure; and
actuating the first switch against the enclosure to initiate one or more communication operations of the wireless communication transceiver in the communication device base, during the moving operation;
wherein the wired connector jack is movably attached to the communication device base, the wired connector jack being configured to move with respect to the communication device base between at least a first connector position and a second connector position, when the communication device base is in the second base position.

7. The method of claim 6, wherein the first switch is configured to slidingly contact an interior surface of the enclosure as the communication device base moves between the first base position and the second base position.

8. The method of claim 6, wherein the first switch is actuated by a structure on an interior surface of the enclosure as the communication device base moves between the first base position and the second base position.

9. The method of claim 6, wherein the wired connector jack is at least partially inserted into the enclosure when the communication device base is in the first base position.

10. The method of claim 6, wherein the wired connector jack is removed from the enclosure when the communication device base is in the second base position.

11. A wireless communication adapter device comprising:
an enclosure; and
a communication device base including a first switch, a wired connector jack, and a wireless communication transceiver, the communication device base being inserted into the enclosure;
wherein movement of the communication device base along an axis within the enclosure from a first base position and a second base position actuates the first switch against the enclosure to initiate one or more communication operations of the wireless communication transceiver in the communication device base; and
wherein the wired connector jack is movably attached to the communication device base and electrically connected to the wireless communication transceiver, the wired connector jack being in a first connector position when the communication device base is in the first base position and being capable of moving to a second connector position when the communication device base is in the second base position.

12. The wireless communication adapter device of claim 11, wherein the communication device base further includes a second switch, the second switch being actuated when the wired connector jack moves between the first connector position and the second connector position and the communication device base is in the second base position.

13. The wireless communication adapter device of claim 12, wherein the one or more communication operations of the wireless communication transceiver initiated in the second base position include establishment of a wireless connection between the wireless communication transceiver and a paired remote wireless transceiver responsive to the wired connector jack moving from the first connector position to the second connector position and the communication device base being in the second base position.

14. The wireless communication adapter device of claim 12, wherein the one or more communication operations of the wireless communication transceiver initiated in the second base position include activation of a wireless pairing operation between the wireless communication transceiver and a remote wireless transceiver responsive to the wired connector jack being in the first connector position and the communication device base being in the second base position.

15. A method of operating a wireless communication adapter device including an enclosure and a communication device base inserted into the enclosure, the communication device base having a first switch, a wired connector jack, and a wireless communication transceiver, the method comprising:
moving the communication device base along an axis within the enclosure from a first base position within the enclosure to a second base position within the enclosure; and
actuating the first switch against the enclosure to initiate one or more communication operations of the wireless communication transceiver in the communication device base, during the moving operation;
wherein the wired connector jack is movably attached to the communication device base and electrically connected to the wireless communication transceiver, the wired connector jack being in a first connector position when the communication device base is in the first base position and being capable of moving to a second connector position when the communication device base is in the second base position.

16. The method of claim 15, further comprising:
actuating a second switch in the communication device base when the wired connector jack moves between the first connector position and the second connector position and the communication device base is in the second base position.

17. The method of claim 16, wherein the one or more communication operations of the wireless communication transceiver initiated in the second base position include establishing a wireless connection between the wireless communication transceiver and a paired remote wireless transceiver responsive to the wired connector jack moving from the first connector position to the second connector position and the communication device base being in the second base position.

18. The method of claim 16, wherein the one or more communication operations of the wireless communication transceiver initiated in the second base position include activating a wireless pairing operation between the wireless communication transceiver and a remote wireless transceiver responsive to the wired connector jack being in the first connector position and the communication device base being in the second base position.

\* \* \* \* \*